Figure 1:
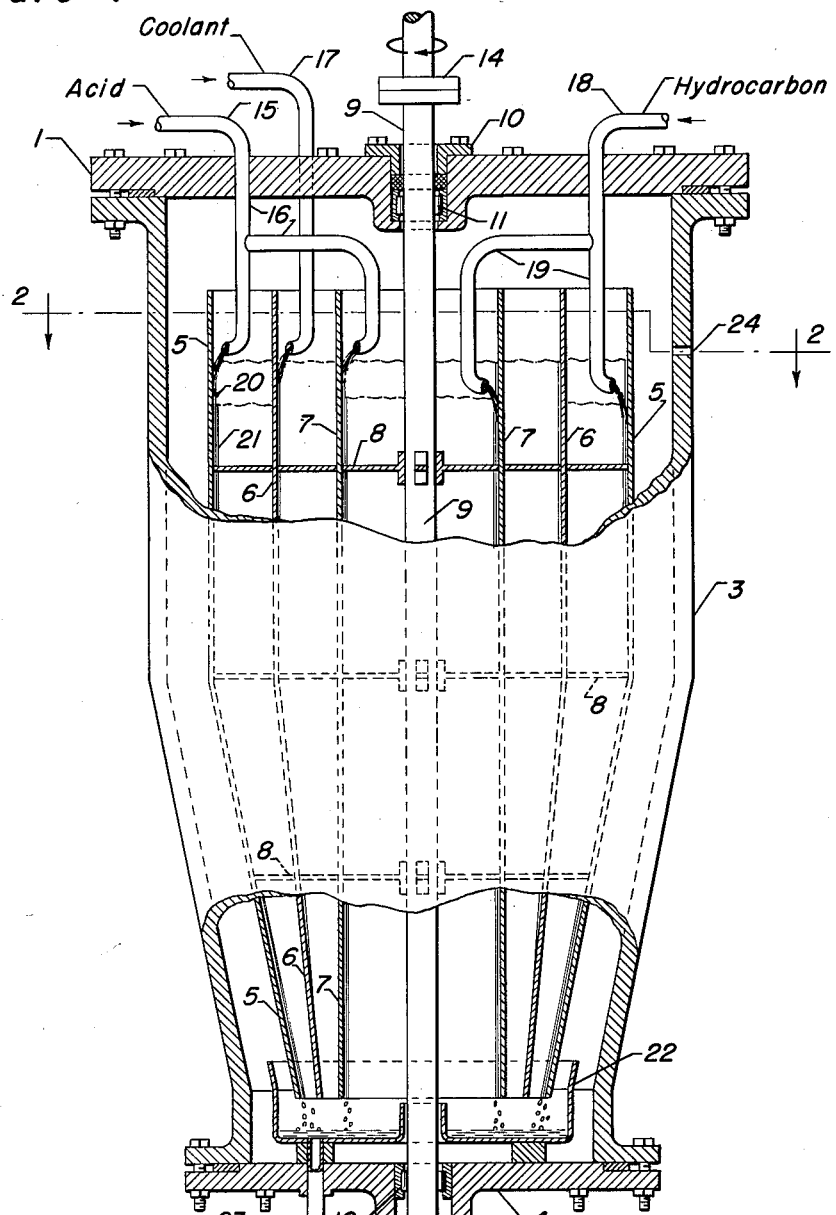

Aug. 8, 1961     G. L. HERVERT     2,995,612
CENTRIFUGAL CONTACTOR
Filed Aug. 17, 1959     2 Sheets-Sheet 1

Aug. 8, 1961   G. L. HERVERT   2,995,612
CENTRIFUGAL CONTACTOR
Filed Aug. 17, 1959   2 Sheets-Sheet 2

INVENTOR:
George L. Hervert
BY:
Chester J. Giuliani
Philip T. Liggett
ATTORNEYS

United States Patent Office 2,995,612
Patented Aug. 8, 1961

2,995,612
CENTRIFUGAL CONTACTOR
George L. Hervert, Downers Grove, Ill., assignor to Universal Oil Products Company, Des Plaines, Ill., a corporation of Delaware
Filed Aug. 17, 1959, Ser. No. 834,082
8 Claims. (Cl. 260—683.48)

This invention relates to an improved contacting apparatus and in particular it concerns a method and means for effecting film-type contact between two liquid phases which are at least partially immiscible, the contactants being caused to flow co-currently and substantially perpendicularly to a supergravitational force field under such conditions that large contactant surface/volume ratios may be obtained. Specifically, the present invention deals with apparatus useful in the catalytic alkylation of alkanes, aromatics or naphthenes in the presence of liquid catalysts such as HF, $H_2SO_4$ or other liquid proton donors.

The hydrogen fluoride-catalyzed reaction of olefins with isoparaffins has been widely utilized in the production of aviation-grade gasolines. The preferred isoparaffin is isobutane, while a variety of olefins or mixtures thereof such as propylene, 1-butene, 2-butene, isobutylene, n-pentenes, n-hexenes, may be employed as the alkylating agent. Charge stock, comprising principally isobutane and olefin and having an isobutane:olefin molal ratio of from about 3:1 to about 8:1, or higher, is contacted with liquid, substantially anhydrous HF acid at a temperature of from about 50° F. to about 150° F. and at a pressure sufficient to maintain the reactants in the liquid phase, that is, from about 50 to about 250 p.s.i. Ideally, the reactants combine to yield, as a primary product, a paraffin species of carbon content equal to the sum of the carbon atoms of the olefin and isobutane, and through careful control of the operating variables, a primary product yield in excess of 90% may be obtained.

Heretofore, the reaction has usually been carried out in a stirred pressure vessel or autoclave wherein the hydrocarbons are vigorously intermixed with the acid catalyst for a space time of from 5 to 20 minutes, the space time being defined as the volume of catalyst within the contacting zone divided by the flow rate of the reactants charged thereto per minute. The acid:hydrocarbon liquid volume ratio within the contacting zone is generally in the range of from 2:1 to 3:1. Cooling coils carrying water or refrigerant are often immersed in the reacting mass and serve to remove the exothermic heat of reaction. While this method of contacting the catalyst and reactants is widely accepted, certain disadvantages are presented thereby. In the first place, the batch-type mixing causes repeated contact of primary alkylate with additional olefin, resulting in "over-alkylation," i.e., the further reaction of primary product with another olefin molecule to form undesirable higher-boiling material at the expense of alkylate yield. For example, dodecanes, as well as octanes, are often present in the effluent leaving an isobutane-butylene alkylation zone. Over-alkylation can be minimized to some extent by maintaining a large isoparaffin:olefin ratio, but such practice increases equipment size and operating costs without increasing plant capacity. Secondly, there is ample opportunity for a portion of the alkylate to contact concentrated acid for a prolonged period of time, resulting in isomerization of certain highly branched compounds present in the product as well as "auto-destructive" alkylation thereof, that is, a cracking-alkylation reaction giving rise to paraffin species having greater and lesser numbers of carbon atoms than the parent compound; these unwanted side reactions further reduce the yield of the desired product. Thirdly, in all HF alkylations, even under optimum conditions, there is formed a small amount of a high-boiling, acid-soluble sludge, commonly referred to as organic diluent; its accumulation in the hydrogen fluoride phase necessitates periodic or continuous regeneration of the acid. Although organic diluent has not been chemically characterized, it is thought to consist in high molecular weight, cyclic hydrocarbons. The formation of organic diluent is enhanced by the relatively large acid:hydrocarbon ratios and the dispersed phase type of mixing employed in conventional contactors.

It is an object of this invention to provide contacting apparatus for achieving an efficient film-type contact between the acid and hydrocarbon phases whereby an optimum reaction contact time may be obtained.

It is another object of the present invention to provide a method and means for sharply limiting the contacting of alkylate both with original olefin and with concentrated acid whereby side reactions such as over-alkylation, product isomerization, auto-destructive alkylation, and sludge formation may be substantially minimized.

A still further object of this invention is to provide a method and apparatus for removing the exothermic heat of alkylation so that the reaction temperature may be controlled.

These and other objects and advantages of the instant invention will be apparent from the accompanying disclosure and drawings.

In essence, the present invention utilizes the density difference and relative immiscibility of the acid and hydrocarbon phases to achieve an efficient film-type contact therebetween and involves subjecting the acid-hydrocarbon interface to a centrifugal force field acting in the direction approximately normal to the interface while moving the contactants through the contacting zone by gravity flow. The heavier acid phase is introduced into the inner surface of a spinning shell member whose axis of rotation is inclined to the horizontal and preferably is vertical. The acid is uniformly distributed over the inner surface and forms a thin, downwardly flowing film. The lighter hydrocarbon phase is distributed over the acid film and it, too, forms a thin, downwardly flowing film, which is superimposed over the acid film. The two phases thus flow co-currently and are kept continuous and undispersed under the influence of centrifugal force. The time of contact depends principally upon the path length parallel to the axis of rotation between reactant inlet and outlet points and, to a lesser degree, upon the speed of rotation of the shell.

In one embodiment, this invention relates to a contacting apparatus comprising a pressure-tight housing, a shell of circular cross-section within said housing whose axis is inclined to the horizontal, means connecting with the shell for rotating it about said axis, inlet means for separately introducing said dense and light liquids onto the upper interior peripheral surface of said shell, and outlet means for removing the resulting contacted liquids from the lower interior surface of said shell.

Another embodiment of this invention provides a method of contacting a dense liquid with a light liquid at least partially immiscible with said dense liquid which comprises forming said dense liquid into a plurality of concentrically spaced, rotating annular films having a vertical axis of rotation, superimposing a light liquid film upon the inner surface of each of the rotating dense liquid films, passing said liquid films in a downward direction and withdrawing a mixture of the resulting contacted liquids from the lowermost portion of said rotating films.

In a more limited embodiment the present invention concerns contacting apparatus which comprises a pressure-tight housing, a plurality of concentrically spaced, vertically elongated shells of circular cross-section within said housing, means connecting with the shells for rotating them about their common vertical axis, a dense liquid inlet conduit extending through said housing and having openings adjacent the upper interior vertical surfaces of alternate shells, a light liquid inlet conduit extending through said housing and having openings adjacent the same vertical surfaces but at a lower elevation than corresponding openings of said dense liquid inlet conduit, a coolant liquid inlet conduit extending through said housing and having openings adjacent the upper interior vertical surfaces of the remaining shells, a vent extending through said housing for withdrawing vapor phase coolant, and liquid collecting and outlet means for removing the resulting contacted liquids from the lower interior surfaces of said shells.

Figure 2:
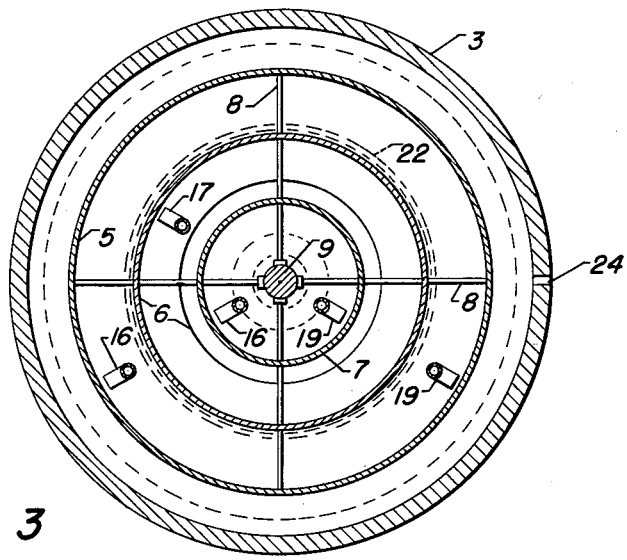
Figure 3:
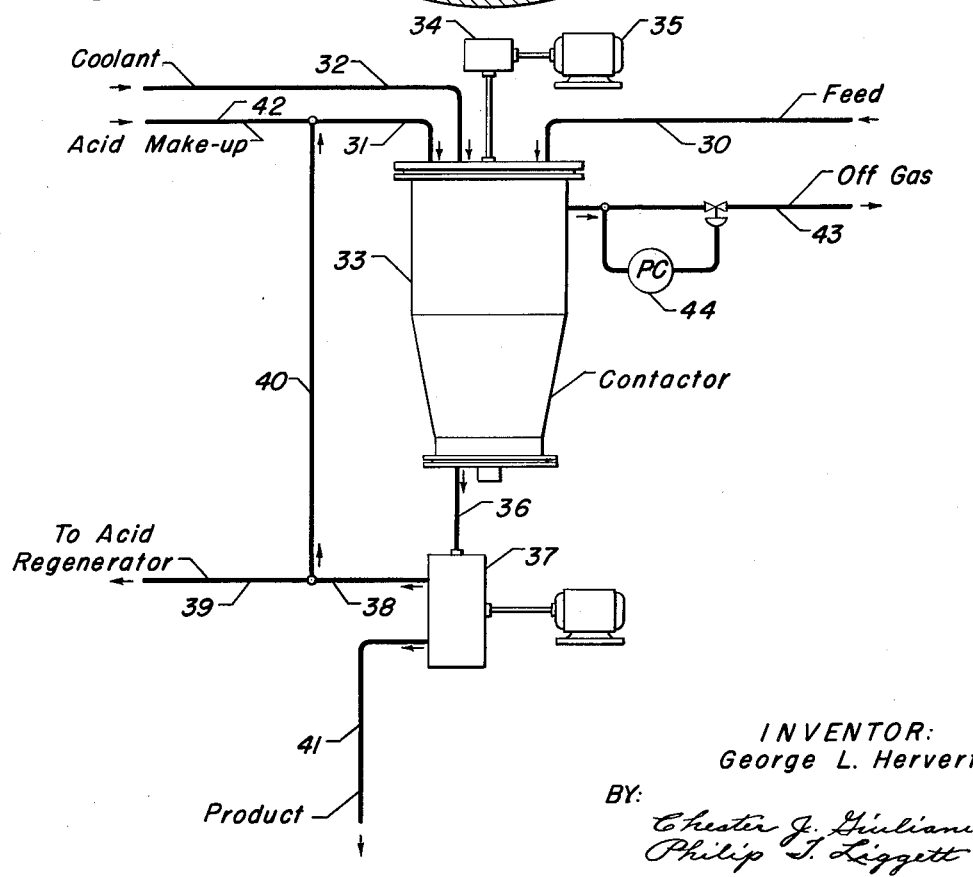

The structure and operation of the contacting apparatus of this invention may be more clearly understood with reference to the accompanying drawings which, while representing the best embodiment of the invention, are intended to be illustrative rather than limiting upon the broad scope thereof. FIGURE 1 is a sectional elevation view of the contactor; FIGURE 2 is a sectional plan view of the contactor taken along line 2—2 of FIGURE 1; the flow diagram of FIGURE 3 illustrates a preferred mode of operation of the contactor when employed in a typical acid-catalyzed alkylation process.

With reference to FIGURES 1 and 2, the contactor comprises a pressure-tight housing defined by a vertically elongated shell member 3, top head 1 and bottom head 4. Shell 3 is provided with flanged end portions and the top and bottom heads are removably attached thereto by through-bolting and gasket means; if desired, the heads may also be secured by clamps, welding or any suitable means, although a permanent attachment thereof would be less desirable from the standpoint of easy accessibility to the contactor internals. A rotatable shaft 9 extends through the top head and is seated upon thrust bearing 13 disposed within or upon bottom head 4; shaft 9 is further supported and guided by top and bottom shaft bearings 11 and 12, and is sealed at its point of extension through top head 1 by packing gland 10. Shaft 9 is connected to an electric motor (not shown) or other suitable prime mover through flexible coupling 14 and, preferably, through speed-changing means. A plurality of concentrically spaced, vertically elongated, imperforate shells 5, 6 and 7 are contained within the housing; the shells are rigidly interconnected, to each other as well as to shaft 9, by a plurality of vertically spaced, radially extending strut members 8. Shells 5, 6 and 7 are of circular cross-section and strut members 8 are symmetrically disposed so that the shaft-shell combination may be dynamically balanced with respect to its axis of rotation.

Three liquid inlet conduits, numbered 15, 17 and 18, extend through top head 1. Conduit 15, which conducts acid, is adapted to discharge onto the upper interior vertical surfaces of shells 5 and 7 by means of nozzles 16. Conduit 18, which carries liquid reactants, is also arranged to discharge onto the upper interior vertical surfaces of shells 5 and 7 by means of nozzles 19; in a preferred embodiment, reactant inlet nozzles 19 are disposed at a lower elevation than acid inlet nozzles 16 so that a uniform outer layer of acid may first be established before it is contacted with hydrocarbon, thereby avoiding mixing or interchange of phases during their downward passage. Conduit 17, conducting a liquid coolant, discharges onto the upper interior surface of shell 6 which is positioned between contacting shells 5 and 7. A trappan 22 is mounted beneath the rotating shells and serves to catch and collect the descending drops of acid, alkylate, and unconverted reactant leaving the bottom of the shells. The resulting heterogeneous mixture of effluent is withdrawn from trap-pan 22 via conduit 23 and is charged to subsequent acid separation facilities. A vent 24 is provided through the wall of shell 3 for continuously withdrawing evaporated coolant.

In operation, shells 5 to 7 inclusive are rotated at any suitable angular velocity, depending upon the specific gravity differential between light and dense phases, and practically limited by the diameter and structural strength of the shells, the induced stress in any portion thereof being proportional to the radius of rotation and the square of the speed. In general, typical rotational speeds may range from about 20 r.p.m. to about 2000 r.p.m. For the liquid-liquid contacting of phases having a relatively large difference in densities, such as the HF-isoparaffin-olefin system hereinabove described, a fairly low rotational speed will suffice to maintain separation of phases, whereas an HF-naphthene system having a smaller difference in densities would, with the same apparatus, require a higher minimum rotational speed. An unnecessarily high speed will, of course, waste power, and may increase liquid hold-up on the shell surface and induce excessive shear stresses in the liquid layers, thereby increasing the contact time and undesirably disturbing the continuity of the liquid-liquid interface. In any event, however, the speed may be adjusted to an optimum value to accommodate phases of any specific gravity difference.

Acid is charged through conduit 15 and nozzles 16, forming a continuous, rotating, downwardly moving film 20 on the inner surface of shells 5 and 7. A mixture of isoparaffin and olefin, in the proper ratio, is charged through conduit 18 and nozzles 19, forming a second continuous film 21 superimposed on film 20. The two films move co-currently and downwardly while simultaneously being rotated; the liquid-liquid interface remains essentially intact until the films pass from the lowermost end of the contacting shells. It is preferred to vary individually the discharge area of nozzles 16 and 19, or to employ equivalent means such as restriction orifices, so that the flow rate of liquid, both acid and hydrocarbons, is controlled in proportion to the surface area of the corresponding shell receiving the liquid; for example, lesser quantities of acid and reactants would be charged to innermost shell 7, having the smallest diameter (surface area) than would be charged to outermost shell 5, having the greatest diameter. In this way, all of the available shell surface area may be utilized to the maximum extent without flooding inner shells or over-reacting the materials on the outer shells. Because of the co-current film-type contact thus established, once the product is formed it cannot contact additional original olefin present in the feed; similarly, its contact with fresh, concentrated acid is restricted. Furthermore, as both the acid and reactant films pass downwardly, the acid concentration is reduced, thus decreasing its activity for product isomerization. As compared with the stirred autoclave type of contactor, the present invention permits the use of lower isoparaffin:olefin ratios and lower acid:reactant volume ratios, decreases alkylate isomerization and sludge formation while correspondingly increasing alkylate yield, and is considerably more conservative of acid catalyst.

The carbon-to-carbon alkylation reaction being exothermic, suitable heat exchange means must be provided to dissipate the heat of reaction. As hereinabove described, a coolant is introduced into the contacting zone through conduit 17. The coolant is selected such that it is readily vaporizable at the temperature and pressure conditions existing within the contactor and preferably is inert toward the reactants and the catalyst; for the isobutane-olefin alkylation, an appropriate coolant is liquid isobutane at bubble point temperature or slightly subcooled; other coolants include low-boiling normal paraffins such as propane and n-butane. The coolant may be introduced onto one or more shells spaced between adjacent contacting shells, such as shell 6; in one embodiment of the apparatus, coolant shells are alternated with contacting shells across the entire diameter of the apparatus. As with the contactants, the coolant is formed into a spinning, downwardly moving film. Heat evolved on shells 5 and 7 is conducted by struts 8 to shell 6 where it is absorbed by the coolant film, causing the coolant to vaporize. Through proper adjustment of the throughput of coolant and contactant, all of the coolant will have been vaporized before it reaches the bottom of shell 6; however, should excess coolant be employed so that a portion thereof descends into pan 22 and admixes with the effluent leaving conduit 23, no harm of consequence will result since the coolant is either isobutane, already present in the effluent in excess amount, or an inert normal paraffin readily separable from the effluent by fractionation. In another embodiment of the apparatus, the coolant shells may be eliminated, that is, all of the shells may be utilized for contacting duty. In this case, a quantity of readily vaporizable coolant, such as excess isobutane, is charged to the shells via nozzles 19 in solution with the olefin in an amount over and above the alkylation requirement therefor, and sufficient to absorb the xothermic heat of reaction. The coolant then evaporates from film 21 on each of the shells, fills the void spaces therebetween, and discharges through vent 24. The pressure and temperature condition within the contactor may readily be adjusted so that only the more volatile coolant is thus vaporized, the higher-boiling alkylate remaining in the liquid phase and ultimately being withdrawn through outlet 23.

The vapor phase coolant withdrawn from the housing through vent 24 may be compressed and liquified in an external refrigeration cycle and recharged to the contactor; alternatively, the coolant vapor may be sent to the overhead vapor line of a downstream fractionator such as a deisobutanizer or debutanizer column. From the standpoint of heat balance control, the quantity of liquid coolant introduced to the contactor may be varied in response to effluent temperature, while the vaporized coolant withdrawal rate may be varied responsive to contactor pressure.

Various modifications may be made to the apparatus without departing from the spirit and scope of the present invention. While the axis of rotation is preferably vertical, it may be disposed at any desired angle to the vertical so long as there is a component of gravity acting parallel to the surface of the shell to insure a generally downward flow of contactants; the effect of reducing the inclination angle of the axis it is to decrease the rate of film progression along the shell surface and therefore to increase the contact time for a given shell length. The contactor may comprise any number of shells with or without cooling shells. A laboratory size contactor may need only one shell whereas a contactor of commercial size may have from 5 to 20 or more shells, depending upon the required contact area. If the contactor is to be employed in a process evolving little or no heat of reaction, such as liquid-liquid extraction service, the coolant shells may be omitted and all of the shell area may be employed for contacting service. Although the contactor of FIGURE 1 has elongated shells, it is within the scope of the invention to provide shells having a greater diameter than length. Also, the shells may be conical, cylindrical, invertedly conical, or of any desired shape, provided they are of circular cross section. For example, with reference to FIGURE 1, innermost shell 7 is cylindrical while shells 5 and 6 are semi-conical. The inward taper of the outer shells is desirable in that it causes the contactants thereon to be subjected to a decreasing centrifugal force as the films move downwardly; such construction enables the film thickness in the lower portion of the shells to be decreased, thereby compensating for the increase in film thickness caused by hydraulic gradient from top to bottom of the shells.

FIGURE 3 is a flow diagram of the contactor section of a typical HF alkylation unit, using the centrifugal contactor of this invention. Only so much of the process flow as concerns the present invention is illustrated; additional equipment and features essential to a complete alkylation unit, such as a product fractionator train, acid regeneration facilities, various recycle streams, etc. have been omitted from the drawing for the sake of clarity. Those skilled in the art will, of course, be able to furnish these elements in accordance with accepted design practice. Feed, acid and coolant are charged to contactor 33 through lines 30, 31 and 32 respectively. Motor 35 rotates the contactor shells through speed changer 34. Contacted effluent is withdrawn through line 36 and passed to centrifugal separator 37 from which a dense HF acid phase is taken off through line 38 and a light hydrocarbon phase, substantially HF-free, is removed through line 41 and sent to a fractionator train. A minor portion of the separated acid is sent to an acid regeneration column via line 39 for removal of accumulated sludge and water therefrom, and the remainder of the separated acid is recirculated to acid inlet conduit 31 through line 41. Regenerated acid and/or fresh acid make-up is added to line 31 through line 42. Vaporized coolant is withdrawn from contactor 33 through conduit 43, the flow thereof being throttled by back-pressure controller 44.

As a specific example of the conditions employed, the process of FIGURE 3 will now be described with reference to an isobutane-butene alkylation unit handling a combined feed of 1000 barrels per day. For this duty, contactor 33 contains 9 shells fabricated of ¼ inch steel plate, each 10 feet in length and concentrically spaced 3¼ inches apart, the maximum shell diameter being 70 inches; five contactant shells providing a total of 550 square feet of contacting area are alternated with four coolant shells having a total of 440 square feet of coolant area. The shells are rotated at 600 r.p.m., producing a centrifugal force of approximately 350 g. on the outermost shell and 66 g. on the innermost shell. Through line 30 there are introduced 1000 barrels per day of combined feed (fresh feed plus one or more recycle streams) having the following molal composition: Propant, 2.1%; butenes, 10.8%; isobutane, 66.5%; n-butane, 19%; and the balance $C_2$ and $C_5$ hydrocarbons. 1000 barrels per day of 97% HF acid is charged through line 31. Coolant, consisting of overhead liquid from a downstream deisobutanizer column and having a molal composition of 94% isobutane and 6% n-butane, is charged through line 32 at a rate of 540 barrels per day. Contacting conditions are 100° F., 5 atmospheres pressure, and an exothermic heat of reaction of 550,000 B.t.u./hour. Light liquid hydrocarbon in the amount of 970 barrels per day is withdrawn through line 41; its molal composition is 2.3% propane, 61.2% isobutane, 22% n-butane, 12.2% light alkylate, and the balance $C_5$'s and heavy alkylate. A slip stream of acid in the amount of 25 barrels per day is sent to an acid regeneration column via line 39 and 25 barrels per day of regenerated acid is returned to the system through conduit 42. Vaporized coolant is removed from the contactor through line 43, condensed and returned to the aforesaid deisobutanizer. The effluent leaving through line 41 is subsequently fractionated to recover light alkylate as a principal product.

The above described flow arrangement may be altered in various respects. For example, centrifugal separator 37 may be replaced with one or more serially connected quiescent settling zones, which method would require a somewhat greater inventory of acid. Liquid propane, instead of isobutane, may be employed as a coolant by raising the contactor pressure to about 250 p.s.i.; the propane may be obtained from the overhead system of a product depropanizer column and recycled thereto after absorbing and removing the heat of reaction in the contactor.

As applied to the acid-catalyzed alkylation of isoparaffins with olefins, the present invention enables lower isoparaffin:olefin ratios and lower acid:reactant volume ratios to be used, decreases alkylate isomerization and sludge formation, increases alkylate yield and expends less acid than does the conventional mixing type of contactor.

Although the contacting apparatus of this invention has been specifically designed to overcome certain problems connected with acid-catalyzed alkylation reactions, it is emphasized that its use is not to be limited thereto. Generically speaking, the essential invention herein is an apparatus and technique for co-currently and non-dispersively contacting two liquid phases and requires only that the phases be at least partially immiscible and have different densities. Accordingly, a great variety of liquid-liquid systems may be contacted by the present means. For example, other acid alkylation catalysts are within the scope of the present invention and include sulfuric acid, phosphoric acid, hydrochloric acid or other hydrogen halide, mixtures of these acids with Friedel-Crafts metal halides such as aluminum chloride, aluminum bromide and zinc chloride, and mixtures of boron trifluoride and hydrogen halide. The present method and apparatus is also applicable to liquid phase hydrocarbon isomerization and polymerization processes wherein a liquid catalyst is used. Apart from service as reaction apparatus, this invention may also be employed in various solvent refining processes including glycol extraction of aromatics from hydrocarbons, refining of lube oils with furfural, monochlorobenzene extraction of acetone from an aqueous solution thereof, aniline extraction of cycloparaffins, recovery of acetic acid from an aqueous solution thereof by extraction with isopropyl ether, and many others.

I claim as my invention:

1. In an apparatus for contacting a dense liquid and light liquid which are at least partially immiscible, the combination of a pressure-tight housing, a shell of circular cross-section within said housing whose axis is inclined to the horizontal, means connecting with the shell for rotating it about said axis, inlet means for introducing said dense liquid onto the upper interior peripheral surface of said shell, separate inlet means for discharging said light liquid toward said upper surface at a lower elevation than the point of said dense liquid introduction, and outlet means for removing the resulting contacted liquids from the lower interior surface of said shell.

2. In an apparatus for contacting a dense liquid and light liquid which are at least partially immiscible, the combination of a pressure-tight housing, at least one vertical shell of circular cross-section within said housing, means connecting with the shell for rotating it about its vertical axis, inlet means for introducing said dense liquid onto the upper interior vertical surface of said shell, separate inlet means for discharging said light liquid toward said upper surface at a lower elevation than the point of said dense liquid introduction, and outlet means for removing the resulting contacted liquids from the lower interior surface of said shell.

3. In an apparatus for contacting a dense liquid and a light liquid which are at least partially immiscible, the combination of a pressure-tight housing, a plurality of concentrically spaced, vertically oriented shells of circular cross-section within said housing, means connecting with the shells for rotating them about their common vertical axis, inlet means for introducing said dense liquid onto the upper interior vertical surface of each of said shells, separate inlet means for discharging said light liquid toward said upper surface at a lower elevation than the point of said dense liquid introduction, and outlet means for removing the resulting contacted liquids from the lower interior surfaces of said shells.

4. In an apparatus for contacting a dense liquid and a light liquid which are at least partially immiscible, the combination of a pressure-tight housing, a plurality of concentrically spaced, vertically oriented shells of circular cross-section within said housing, means connecting with the shells for rotating them about their common vertical axis, a dense liquid inlet conduit having openings adjacent the upper interior vertical surfaces of at least two of said shells, a light liquid inlet conduit having openings adjacent the same vertical surfaces but at a lower elevation than the openings of said dense liquid inlet conduit, and outlet means for removing the resulting contacted liquids from the lower interior surfaces of said shells.

5. In an apparatus for co-currently contacting a dense liquid and light liquid which are at least partially immiscible, the combination of a pressure-tight housing, a plurality of concentrically spaced, vertically elongated shells of circular cross-section within said housing, means connecting with the shells for rotating them about their common vertical axis, a dense liquid inlet conduit and a light liquid inlet conduit both extending through said housing and both having openings adjacent the upper interior vertical surfaces of at least two of said shells, the openings of said dense liquid inlet conduit being at a higher elevation than corresponding openings of said light liquid inlet conduit, a container disposed within said housing and below said shells and receiving the resulting contacted liquids from the lower interior surfaces of the shells and an outlet conduit communicating with said container and extending through said housing to the exterior thereof.

6. In an apparatus for co-currently contacting a dense liquid and light liquid which are at least partially immiscible, the combination of a pressure-tight housing, at least thru concentrically spaced, vertically elongated shells of circular cross-section within said housing, means connecting with the shells for rotating them about their common vertical axis, a dense liquid inlet conduit extending through said housing and having openings adjacent the upper interior vertical surfaces of alternate shells, a light liquid inlet conduit extending through said housing and having openings adjacent the same vertical surfaces but at a lower elevation than corresponding openings of said dense liquid inlet conduit, a coolant liquid inlet conduit extending through said housing and having an opening adjacent the upper interior vertical surface of the shell between said alternate shells, a vent extending through said housing for withdrawing vapor phase coolant, and liquid collecting and outlet means for removing the resulting contacted liquids from the lower interior surfaces of said shells.

7. In a process for co-currently contacting a liquid reactant with a liquid catalyst at least partially immiscible with and having a greater density than said reactant, said contacting process being accompanied by the evolution of heat, the steps which comprise first forming said catalyst into a plurality of concentrically spaced, rotating annular films whose common axis of rotation is inclined to the horizontal, said rotating films being contained within an enclosed contacting zone, thereafter superimposing a reactant film upon the inner surface of each of the rotating catalyst films, introducing into said contacting zone a liquid coolant which is readily vaporizable at the contacting temperature, forming said coolant into at least one rotating annular film spaced between two of the first mentioned rotating films, withdrawing vaporized coolant from said contacting zone in sufficient quantity to maintain the desired contacting temperature, and withdrawing from the lowermost portion of the first-mentioned rotating films a liquid mixture comprising product and catalyst.

8. In a process for co-currently contacting a liquid reactant with a liquid catalyst at least partially immiscible with and having a greater density than said reactant, said contacting process being accompanied by the evolution of heat, the steps which comprise first forming said catalyst into a rotating annular film whose axis of rotation is inclined to the horizontal, said rotating film being contained within an enclosed contacting zone, thereafter superimposing a reactant film upon the inner surface of said rotating catalyst film, said reactant including in solution therewith a liquid coolant which is readily vaporizable at the contacting temperature and present in sufficient amount to absorb said evolved heat withdrawing vaporized coolant from said contacting zone, in sufficient quantity to maintain the desired contacting temperature, flowing said rotating catalyst and reactant films generally downward and withdrawing from the lowermost portion of said rotating films a liquid mixture comprising product and catalyst.

References Cited in the file of this patent

UNITED STATES PATENTS

| | | |
|---|---|---|
| 1,232,104 | Sharples | July 3, 1917 |
| 1,284,488 | Steward | Nov. 12, 1918 |
| 1,575,116 | Jones | Mar. 2, 1926 |